(12) United States Patent
Jordan et al.

(10) Patent No.: US 8,459,612 B2
(45) Date of Patent: **\*Jun. 11, 2013**

(54) DEVICE FOR GRIPPING AND INSTALLING WIRE

(75) Inventors: David Jordan, Knoxville, TN (US); Michael Jordan, Knoxville, TN (US)

(73) Assignee: Southwire Company, Carrollton, GA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/608,057

(22) Filed: Sep. 10, 2012

(65) Prior Publication Data

US 2013/0001491 A1    Jan. 3, 2013

Related U.S. Application Data

(63) Continuation of application No. 12/398,840, filed on Mar. 5, 2009, now Pat. No. 8,292,267.

(60) Provisional application No. 61/034,095, filed on Mar. 5, 2008.

(51) Int. Cl.
*H02G 1/08* (2006.01)
*B63B 35/03* (2006.01)

(52) U.S. Cl.
USPC ............... 254/134.3 R; 254/134.3 FT

(58) Field of Classification Search
USPC ............... 254/134.3 FT, 134.3 R; 403/314, 403/374.1–374.5, 409.1
See application file for complete search history.

(56) References Cited

U.S. PATENT DOCUMENTS

| | | |
|---|---|---|
| 321,130 A | 6/1885 | Moore |
| 564,012 A | 7/1896 | Fraser |
| 690,438 A | 1/1902 | Jones |
| 707,732 A | 8/1902 | Swarm |
| 749,760 A | 1/1904 | Townsend |
| 842,329 A | 1/1907 | McClean |
| 1,265,141 A | 5/1918 | Trippe |
| 1,272,392 A | 7/1918 | Craven et al. |
| 1,504,087 A | 8/1924 | Brady |
| 1,520,716 A | 12/1924 | Judd |
| 1,634,422 A | 7/1927 | Holmes |
| 1,760,885 A | 2/1928 | Prelesnik |
| 1,720,037 A | 7/1929 | Entwistle et al. |
| 2,146,575 A | 2/1939 | Hefftner |
| 2,322,464 A | 6/1943 | McKee et al. |
| 2,766,501 A | 5/1951 | Kellems |
| 2,614,801 A | 10/1952 | Mazzei |
| 2,853,335 A | 11/1953 | Mogle |
| 2,697,872 A | 12/1954 | Armstong |

(Continued)

OTHER PUBLICATIONS

International Search Report & Written Opinion dated Nov. 17, 2009 in PCT Application No. PCT/09/36224.

(Continued)

*Primary Examiner* — Monica Carter
*Assistant Examiner* — Nirvana Deonauth
(74) *Attorney, Agent, or Firm* — Hartman & Citrin LLC

(57) ABSTRACT

A wire pulling grip easy and reliably grips wire for pulling the same through a conduit or the like. The grip has cams which maintain contact with the wire even when tension is not applied and regardless of the orientation of the grip, significantly reducing the likelihood that the connection with the wire is lost. The cams are selectively releasable to allow the wire to be easily removed from the grip.

20 Claims, 5 Drawing Sheets

U.S. PATENT DOCUMENTS

| | | |
|---|---|---|
| 2,736,532 A | 2/1956 | Hughes |
| 2,935,299 A | 5/1960 | Jansen |
| 2,950,525 A | 8/1960 | Duncan et al. |
| 3,252,210 A | 5/1966 | Bowden |
| 3,312,128 A | 4/1967 | Wasson |
| 3,492,032 A | 1/1970 | Deike |
| 3,659,890 A | 5/1972 | Renfroe |
| 3,709,546 A | 1/1973 | Vaughan |
| 3,730,129 A | 5/1973 | Helms |
| 3,776,586 A | 12/1973 | Ahlgren et al. |
| 4,015,873 A | 4/1977 | Langguth |
| 4,019,715 A | 4/1977 | Vugrek |
| 4,077,094 A | 3/1978 | Swager |
| 4,214,362 A | 7/1980 | Beard |
| 4,312,124 A | 1/1982 | Calhoun |
| 4,354,705 A | 10/1982 | Shorey et al. |
| 4,368,910 A | 1/1983 | Fidrych |
| 4,377,956 A | 3/1983 | Cooper |
| 4,575,032 A | 3/1986 | Taylor |
| 4,659,126 A | 4/1987 | Breck et al. |
| 4,736,971 A | 4/1988 | McManus |
| 4,736,978 A | 4/1988 | Cielker |
| 4,746,099 A | 5/1988 | Lopes |
| 4,843,687 A | 7/1989 | Kroepelin, Jr. |
| 5,015,023 A | 5/1991 | Hall |
| 5,022,633 A | 6/1991 | Lopes |
| 5,127,853 A | 7/1992 | McMills et al. |
| 5,199,146 A | 4/1993 | Grover et al. |
| 5,245,730 A | 9/1993 | Martin |
| 5,513,555 A | 5/1996 | Plank et al. |
| 5,548,873 A | 8/1996 | Macias |
| 5,984,273 A | 11/1999 | Ray |
| 5,988,719 A | 11/1999 | Lavender |
| 6,178,604 B1 | 1/2001 | Pennoyer, Jr. |
| 6,286,815 B1 | 9/2001 | Ray |
| 6,416,040 B1 | 7/2002 | Bergman |
| 6,446,531 B1 | 9/2002 | Colombani |
| 6,682,050 B1 | 1/2004 | Ray |
| 6,883,782 B2 | 4/2005 | Ames et al. |
| 6,974,169 B1 | 12/2005 | Upton |
| 7,128,306 B2 | 10/2006 | Ames et al. |
| 7,146,697 B2 | 12/2006 | Chan et al. |
| 7,246,789 B2 | 7/2007 | Ames et al. |
| 7,478,794 B1 * | 1/2009 | Gohlke et al. ....... 254/134.3 FT |
| 1,039,727 A1 | 10/2012 | Gilmartin |
| 8,292,267 B2 * | 10/2012 | Jordan et al. ........... 254/134.3 R |
| 2007/0221896 A1 | 9/2007 | Jordan |
| 2009/0065663 A1 | 3/2009 | Jordan |
| 2009/0224220 A1 * | 9/2009 | Jordan et al. ........... 254/134.3 R |

OTHER PUBLICATIONS

U.S. Office Action dated Feb. 16, 2012 in U.S. Appl. No. 12/398,840.
U.S. Notice of Allowance dated Jun. 7, 2012 in U.S. Appl. No. 12/398,840.

* cited by examiner

DEVICE FOR GRIPPING AND INSTALLING WIRE

RELATED APPLICATIONS

The present application is a continuation of U.S. application Ser. No. 12/398,840, entitled "Device for Gripping and Installing Wire," filed on Mar. 5, 2009, now U.S. Pat. No. 8,292,267 which claims the benefit of U.S. Provisional Application Ser. No. 61/034,095, filed Mar. 5, 2008, each of which is expressly incorporated herein in its entirety.

BACKGROUND OF THE INVENTION

1. The Field of the Invention

The present invention relates to installing wire, cables (such as fiber optic cables or communications cables), or the like. More specifically, the present invention relates to a device for gripping a wire, cable, or similar object so as to enable that object to be pulled through a conduit or other enclosure to install the object.

2. State of the Art

Wires, cables, and the like are commonly installed by pulling the same through a conduit. Industrial or commercial construction of buildings commonly involves placing conduits in the walls of the building and installing wires or cables in the conduit after construction of the wall has been completed. Similarly, municipal wires and cables are often pulled through underground conduits in order to install the cables. Herein, the term wire is used to describe the various types of wires, cables, and the like which are similarly pulled through conduits to install the same.

When installing wires, a rope or other pulling line is first threaded through the conduit. One end of the pulling line is then connected to the wire, and a pulling machine is attached to the other end of the pulling line and used to pull the wire through the conduit via the pulling line. The pulling machine will typically exert a force of a thousand pounds or more in order to pull the wire through the conduit. Lengthy conduits, bends in the conduit, and the stiffness of the wire itself all contribute to the high pulling force required to pull wires through a conduit.

In municipal applications such as underground power lines or communications lines, the wires being installed are typically larger than those used in commercial buildings, and require a very high pulling force in order to successfully install the desired wire into the conduit.

When installing a wire, it is highly desirable to successfully install the wire without losing the connection between the pulling line and the installed wire. If the connection between the pulling line and installed wire is lost during a pull, it is typically impossible to reconnect the wire and pulling line inside of the conduit. As such, the wire must be removed from the conduit and the pull must be started again from the beginning. It is typically impossible to remove the wire from the conduit without damaging the wire. Because of the space constraints (especially in underground municipal applications), it is typically necessary to attach a pulling line to the wire every few yards while the wire is pulled a section. Attachment to the wire typically pierces the insulation or otherwise damages the wire and renders the wire unusable. Where multiple wires are being pulled at once through a conduit, all of the wires must be removed from the conduit and are typically thereafter unusable.

It is thus appreciated that losing connection between the pulling line and the wire results in both a significant loss of time and a significant monetary loss in the unusable wire. The larger wires used in municipal installations may cost several thousands of dollars for a single run of wire. It can be appreciated that it is necessary to have a secure and reliable connection between the pulling line and the installed wire.

It is also necessary to have a connection between the pulling line and installed wire which is able to reliably transmit thousands of pounds of force between the pulling line and the installed wire. It is desirable that the connection between the pulling line and installed wire be able to remain connected throughout the pull even if tension is temporarily lost or varies through out the pull, and should be able to remain connected regardless of the orientation of the connection between the pulling line and wire. It is particularly desirable to have a connector which remains easy and convenient to use while providing a secure attachment capable of transmitting a very high force to the wire.

It is thus desirable to have a connector which is capable of connecting a pulling line and a wire securely and reliably. It is desirable to have a connector which is capable of transmitting very high pulling forces between the pulling line and wire reliably. It is desirable to have a connector which remains securely connected to the pulling line and wire even if tension is lost and regardless of the orientation of the connector. It is desirable to have a connection which remains easy to use while providing a more secure and reliable operation.

SUMMARY OF THE INVENTION

It is an object of the present invention to provide an improved connector for connecting a pulling line to a wire for pulling the wire through a conduit.

According to one aspect of the invention, a connector is provided which releasably grips a wire. The connector may be provided with a body through which the wire passes and a plurality of cams to grip the wire. The cams allow the wire to be easily passed in one direction through the body, but grip the wire to prevent movement of the wire in the opposing direction so as to transmit a pulling force to the wire.

According to another aspect of the invention, the cams are biased towards the center of the body in a position to grip the wire. The cams are biased towards a wire which is placed through the body of the connector so that the cams remain in contact with the wire even if tension is not applied to the wire and regardless of the orientation of the connector.

According to another aspect of the invention, the biasing element which biases the cams towards the center of the body is movable so as to allow the cams to move away from the center of the body in an unbiased manner. This allows the grip on the wire to be selectively released to allow the wire or a foreign object to be removed from the connector.

According to another aspect of the invention, a connector is provided which includes a body having cams therein for gripping the wire, and which also includes a Kellum grip attached thereto. The free end of the Kellum grip is attached to the pulling line. The Kellum grip, when placed in tension, grips the wire and is capable of applying a very large pulling force to the wire. The connector body secures the connector end of the Kellum grip to the wire so that the Kellum grip is placed in tension when the pulling line is connected to the free end of the Kellum grip and tension applied thereto.

These and other aspects of the present invention are realized in a device for pulling wire or the like as is shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
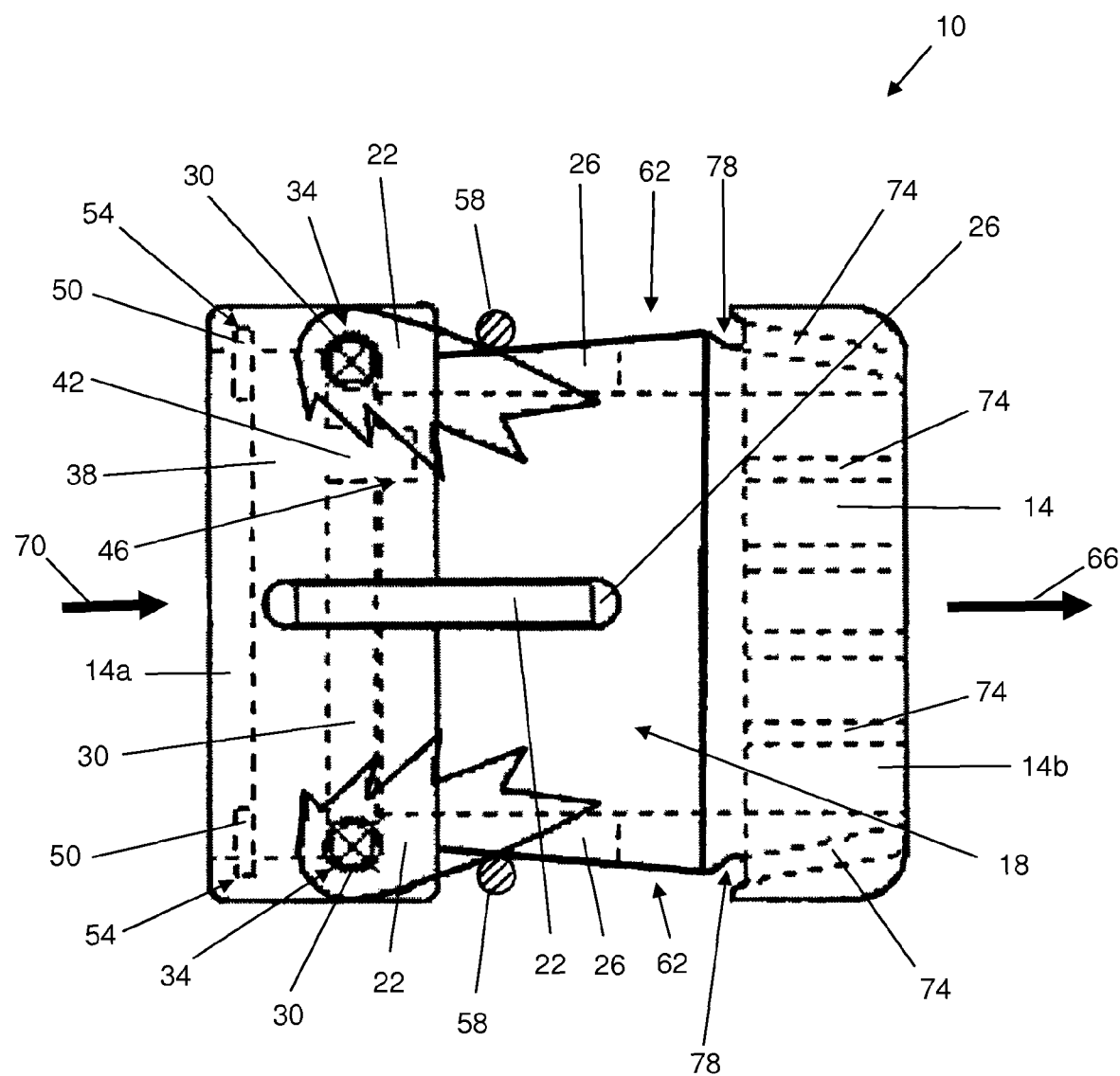
FIG. 1 shows a side view of a wire gripping device of the present invention.

Turning now to FIG. 1, a side view of a wire pulling grip 10 is shown. In discussing the grip 10, exemplary sizes are given to promote understanding of the grip. It will be appreciated, however, that various sizes of the grip 10 are made to allow a wide variety of sizes of wire to be pulled with the grip. The grip 10 includes a body 14 having a bore 18 therethrough. The body 14 is about 1.5 inches in diameter, and the bore 18 through the body is about 1.1 inches in diameter. The body 14 has a distal end 14a and a proximal end 14b.

A plurality of cams 22 (four are used in the present embodiment, although smaller or larger sizes may use fewer or additional cams) are pivotably mounted to the body 14. The cams 22 pass through slots 26 in the body 14 to allow the cams to pivot inwardly towards the center of the bore 18 or outwardly to extend out from the body. The cams 22 are mounted to a rolled ring 30 which is circular in shape and cross section and which forms a pivot for the cams. The ring 30 is typically made with a small gap to allow the cams 22 to be placed thereon. The ring fits in a shoulder or groove 34 which is formed in the body 14.

A spacer bushing 38 is installed against the ring 30 to hold the ring in place in the body. The spacer bushing 38 has a tab or post 42 formed on a side thereof which passes through the gap in the ring 30 and fits into a notch 46 formed in the body 14 to prevent rotation of the ring 30 and spacer bushing 38 to prevent loss of the cams 22. A spring clip 50 fits against the spacer bushing 38 and into a groove 54 in the body 14 and locks the spacer bushing 38 and ring 30 in place.

An elastic ring 58 (which could be a rubber ring, a circular spring, etc.) is placed around the body 14 in a sloped portion 62 of the body. The slope urges the elastic ring 58 towards the pivot ring 30, biasing the cams 22 towards the center of the body 14. Additionally, any friction on the elastic ring 58 while pulling wires through a conduit will also tend to bias the elastic ring 58 towards the pivot ring 30. If the cams 22, sloped portion 62, and elastic ring 58 are appropriately sized, the cams 22 will be biased completely to the center of the bore 18. In operation, the cams 22 are thus biased towards a wire which is placed through the bore 18, and are held in contact with the wire. This ensures that the grip 10 does not lose connection with the wire if a pulling force is not applied to the grip 10, if the pulling force is temporarily lost, or if the grip 10 is placed in any physical orientation.

In use, the grip 10 is pulled in the direction of arrow 66. Resistance to moving the wire which is being pulled by the grip 10 will cause the cams 22 to rotate inwardly towards the center of the bore 18 and thus increase the force by which the wire is gripped. A high degree of force can be reliably applied to the wire as the cams 22 maintain contact and tighten with the application of force. In use, the grip 10 is connected to a pulling line, a wire is passed through the body 14 through the distal end 14a of the grip in the direction of arrow 70, and the grip 10 and wire are pulled in the direction of arrow 66.

Typically, the grip 10 is used in combination with a wire Kellum grip. A Kellum grip is a tube made of braided wires. The tube is loosely braided so that it increases diameter when compressed and decreases diameter when stretched. As such, the tube compresses around a wire or cable when placed in tension. Conventional Kellum grips are simply a braided tube of wire with a loop formed on one end to attach to the pulling line. The open end of the tube is placed over the wire, secured to the wire (usually with duct tape or the like), and the Kellum grip is then used to pull the wire. The problem with conventional Kellum grips is the difficulty in securing the open end of the tube to the wire.

Typically, duct tape or the like is used to secure the open end of the tube to a wire. The duct tape, however, can be difficult to remove afterwards and may leave an undesirable residue on the wire or Kellum grip. Additionally, there is some risk that the duct tape peels off of the grip/wire during a pull and begins to stick to the conduit, which may remove the tape completely and result in the loss of connection between the wire and grip.

Figure 5:
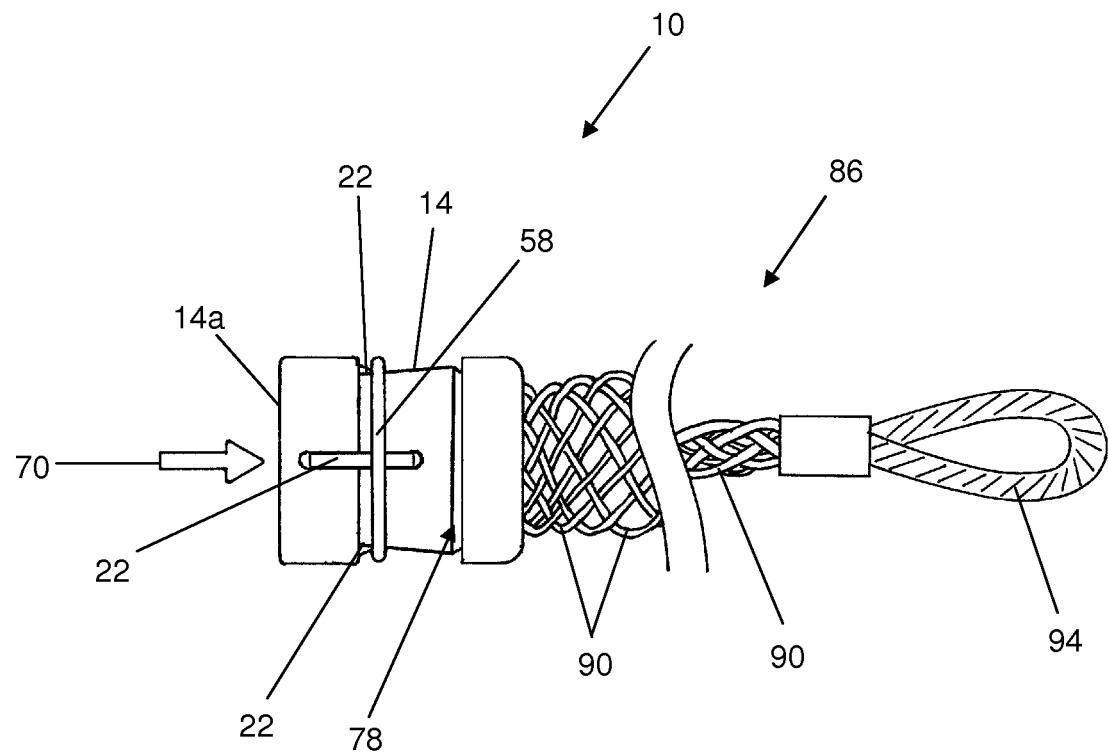
FIG. 5 shows a side view of the device of FIG. 1.

In order to be utilized in combination with a Kellum type grip, the proximal end 14b of the body 14 has holes 74 and a groove 78 formed therein. The holes 74 are spaced around the edge of the body 14 and are in communication with the groove 78 to allow wires to be laced therethrough without overly protruding radially from the body 14. The grip 10 with the Kellum grip attached therethrough is shown in FIG. 5.

Figure 2:
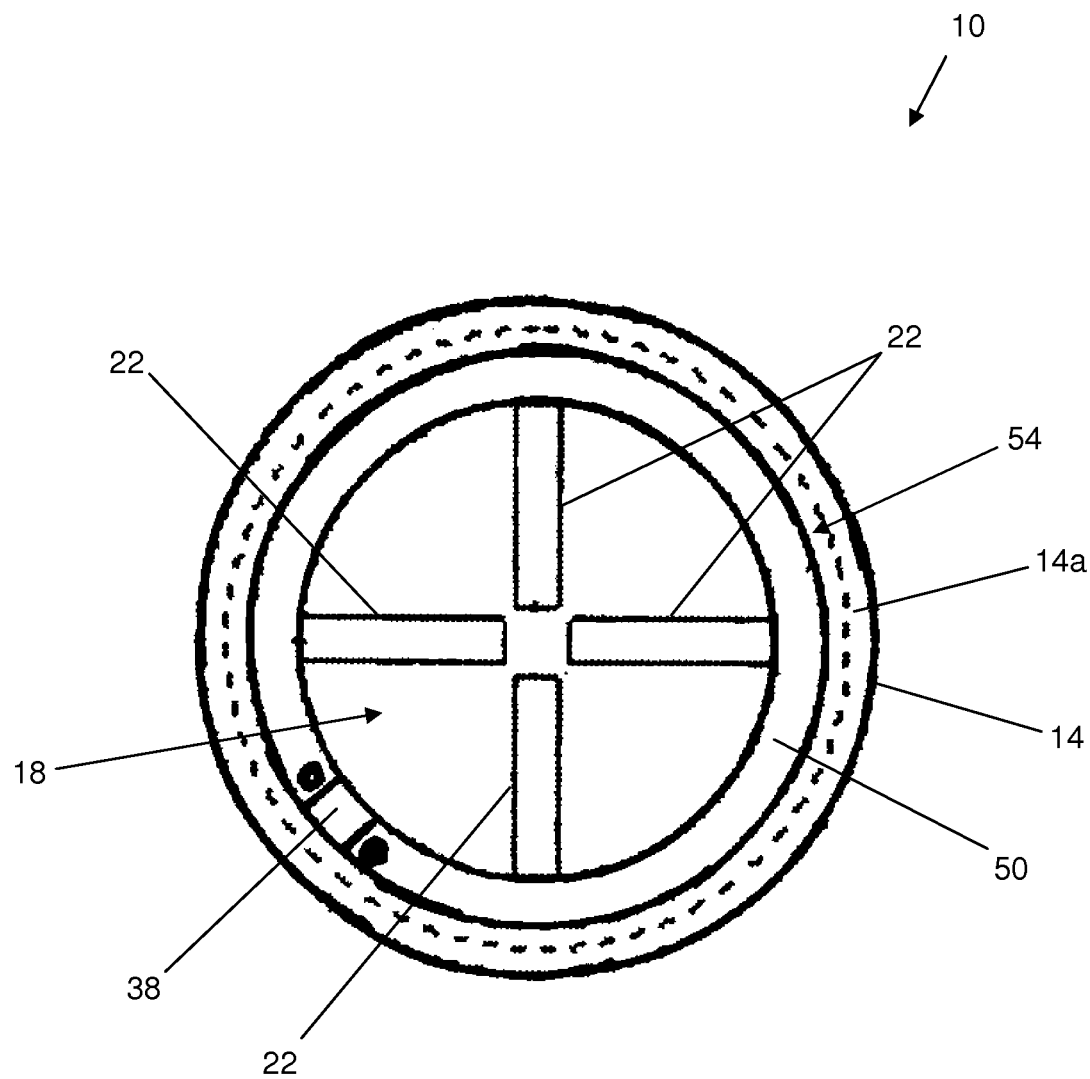
FIG. 2 shows an end view of the distal end of the device of FIG. 1.

Turning now to FIG. 2, an end view of the distal end 14a of the grip 10 is shown. The spring clip 50 and spacer bushing 38 are visible, as well as the cams 22. The cams are biased into the bore 18 in the position shown by the elastic ring 58. It can be seen how the cams 22 extend almost completely into the center of the bore 18, and would maintain contact with a wire of approximately 0.125 inch diameter while still accommodating a wire of about 1 inch diameter. The grip 10 is thus usable with many sizes of wire.

Figure 3:
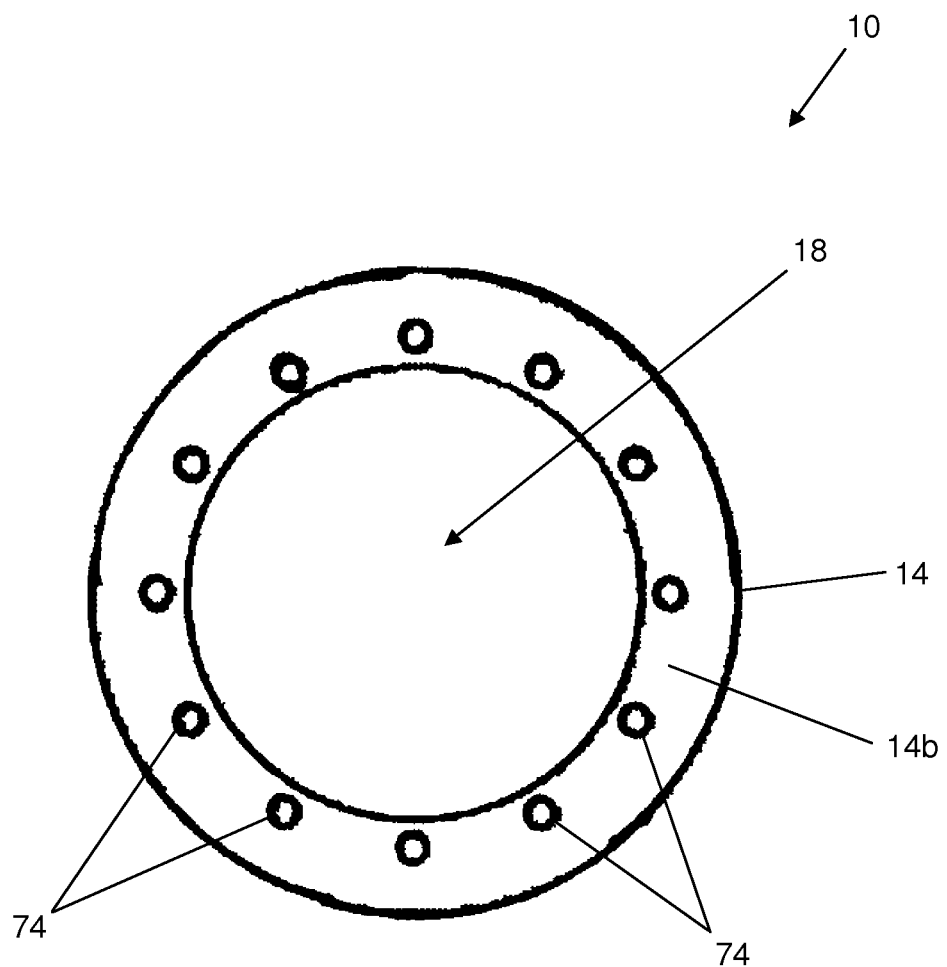
FIG. 3 shows an end view of the proximal end of the device of FIG. 1.

Turning now to FIG. 3, an end view of the proximal end 14b of the grip 10 is shown. It can be seen how the holes 74 are spaced around the body 14. The holes 74 accommodate wires to attach a Kellum grip to the body 14.

Figure 4A:
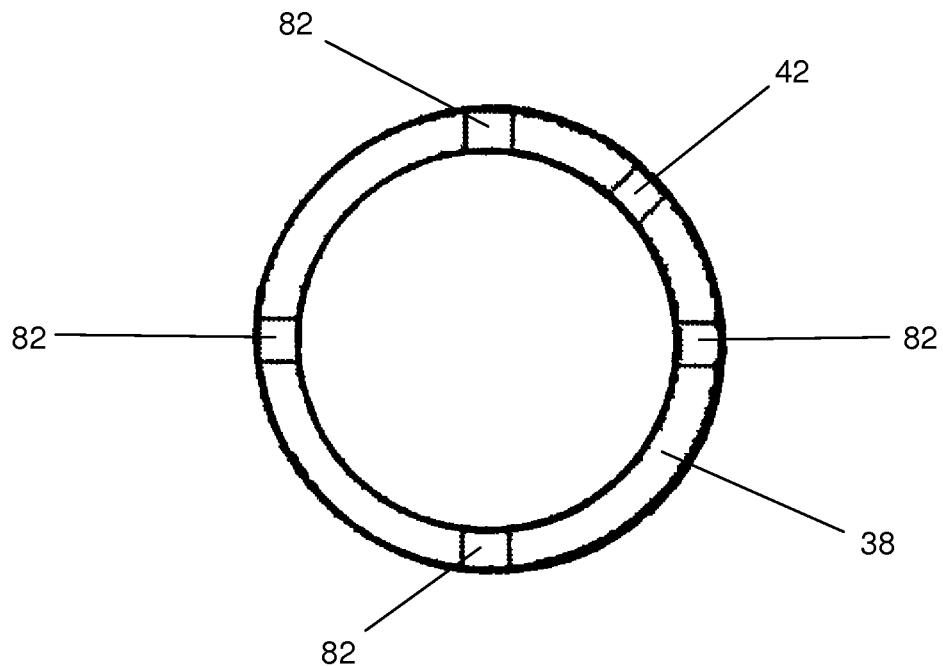
FIGS. 4A and 4B show side and end views of the spacer busing of the device of FIG. 1.
Figure 4B:
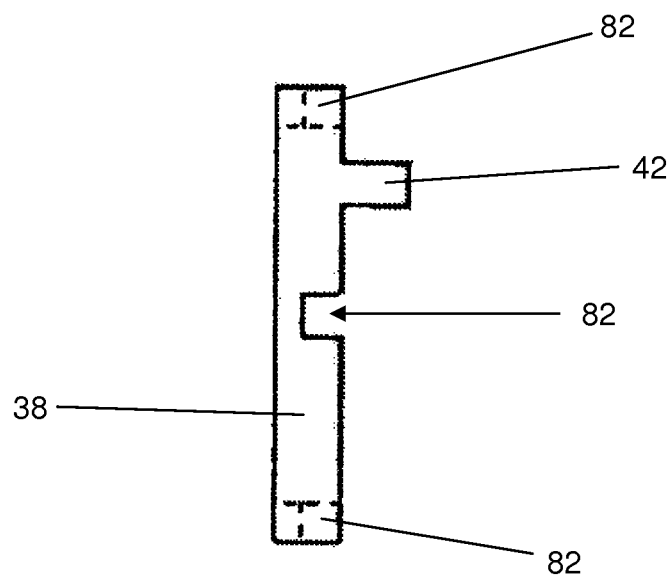

Turning now to FIGS. 4A and 4B, side and end views of the spacer bushing 38 are shown. As discussed, the spacer bushing 38 includes a post 42 which is received in a notch 46 in the body 14 to prevent rotation of the spacer bushing 38 and pivot ring 30 and loss of the cams 22. The spacer brushing 38 may also be made with notches 82 which receive the cams 22, allowing a closer fit between the spacer bushing 38 and cams 22.

Turning now to FIG. 5, a side view of the grip 10 combined with a braided wire tube 86 (such as a Kellum grip) is shown. For clarity, many structures shown in the previous figures are not numbered, but are understood to be present in the figure. The Kellum grip 86 includes a plurality of wires 90 which are braided together into a tube as discussed. The wires 90 are laced through the holes 74 (FIG. 1) in the grip 10. The groove 78 keeps the wires 90 from protruding too far radially from the body 14. The wires 90 are typically formed into or connected to a loop 94 which is connected to a pulling line. Thus, the bore or lumen formed by the braided tube of wires does not typically extend completely through the wires 90, but is closed at the proximal end of the wires by the loop 94.

In use, a wire is passed through the distal end 14*a* of the body 14, passed through the bore 18 (FIG. 1), and is passed through the center of the braided wire grip 86 in the direction of arrow 70. The wire is passed through the center of the braided wires 90. The cams 22, biased by the elastic ring 58, maintain contact with the wire and prevent movement of the wire in the opposite direction. The loop 94 is then connected to a pulling line and the pulling line is used to pull the grip 10 and wire through a conduit. The grip 10 secures the distal end 14*a* of the Kellum grip 86 to the wire, and both the grip 10 and Kellum grip 86 transmit pulling force to the wire.

When a pull is completed, the grip 10 and Kellum grip 86 are easily removed from the wire. The elastic ring 58 is moved adjacent to the groove 78, allowing the cams 22 to pivot away from the wire. The cams 22 can then freely pivot out of the bore 18. The grip 10 and Kellum grip 86 are simply slid off of the wire in the direction of arrow 70. The grip 10 with Kellum grip 86 is thus advantageous as it is easily and quickly installed and removed from a wire while being capable of transmitting well over 10,000 pounds of force to the wire. In testing the pulling capability of the grip 10 and Kellum grip 86, the observed mode of failure has been the wires 90 breaking, suggesting that nearly any needed pulling force may be supplied if the wires 90 are sized appropriately.

The grip 10 provides an additional level of safety and convenience in use as compared to existing wire pulling grips. There are known wire pulling grips which use teeth mounted in a tubular body to secure and pull a wire. The wire is inserted into the body and the teeth allow for movement of the wire in only one direction. After the pull is completed, the wire must be cut and passed through the body in the direction of loading. These grips require that the person installing the wire cut the wire, remove a cap/pulling eyelet from the body, pass the cut portion of wire through the body, and reattach the cap before starting another pull. This results in lost time. Additionally, if a person accidentally places a tool or finger inside of the body, the object must be similarly removed. Where a finger is placed in the body, it is quite difficult to remove the finger without damage to the finger as the teeth prevent withdrawal of the finger. Thus, the grip 10 is much easier to use than available prior art grips.

Additionally, the combination of the grip 10 and the braided wire tube 86 provides significant advantages over prior art configurations. Where braided wire tubes, such as Kellum grips, are used, the Kellum grip is difficult to use. As has been discussed, duct tape or the like is typically used to attach the distal end of the Kellum grip to the wire. The duct tape, however, has limited ability to secure the Kellum grip wires to the wire which is being pulled. As a result, the duct tape may allow the Kellum grip to slip off of the wire which is pulled if too high of a pulling force is applied. Additionally, the duct tape will rub against the conduit as the wire is pulled therethrough, which may cause the leading edge of the tape to roll back and expose the adhesive of the tape. The exposed adhesive will then stick to the conduit and may cause the duct tape to be removed entirely. Either of these situations may result in a loss of connection with the wire which is being pulled through a conduit. Efforts to more securely attach a Kellum grip to the wire take additional setup time and additional time to remove the Kellum grip from the wire, reducing the working speed and efficiency of the persons installing wire. Thus, the pulling force which is applied to a Kellum type grip is limited, and the use of the Kellum grip to pull wires has some risk of losing connection with the wire which is being pulled.

The present invention, however, provides significant advantages when a grip 10 is combined with a Kellum type braided wire tube as shown in FIG. 5. As has been discussed above, the grip 10 provides a secure connection with the wire which will transmit a significant pulling force to the wire. Loss of connection between the grip 10 and the wire is virtually eliminated altogether. Since the grip 10 does not lose connection with the wire, the braided wire grip portion 86 also does not lose connection with the wire. The combined wire pulling grip is thus very reliable as loss of connection with the wire is virtually eliminated.

Additionally, the combination of grip 10 and braided wire tube 86 transmits a very high degree of force to the wire. While cams and spikes transmit force to a wire at a few points which are close together, the combined grip transmits pulling force to a longer length of the wire at many locations along the wire. Thus, a very high pulling force is transmitted to the wire without concentrating the force on only a few locations on the wire. Placing the entire pulling force at only a few locations on the wire may result in failure of the wire itself. Testing of the grip 10 and braided wire tube 86 as shown in FIG. 5 has demonstrated that failure of the grip occurs at failure of the individual wires 90 rather than failure of the wire which is pulled or a loss of connection between the wire and the pulling grip. Thus, many thousands of pounds of force are reliably transmitted to the wire which is pulled.

The grip 10 and braided wire tube 86 are also significantly easier to use than previous wire pulling grips. Previous wire pulling grips have required a significant amount of work to install and remove the grip from the wire, and often result in a loss in productivity. Thus, while prior art designs have been a tradeoff between ease of use and reliability/pulling strength, the pulling grip of the present invention maximizes pulling strength and reliability while being extremely quick and easy to use.

There is thus disclosed an improved wire pulling grip. It will be appreciated that numerous changes may be made to the present invention without departing from the scope of the claims.

What is claimed is:

1. A connector comprising:
    a body having a bore through which a wire may be passed;
    a plurality of cams pivotably attached to the body, the plurality of cams being pivotable relative to the body between a first position where the plurality of cams extend into the bore of the body so as to contact the wire when the wire is inserted in a first direction into the bore of the body and a second position where the plurality of cams extend outwardly from the body so as to release the wire to allow the wire to be withdrawn from the bore of the body in a second direction opposite the first direction; and
    a biasing element which biases the plurality of cams into the first position.

2. The connector of claim 1, wherein the biasing element is selectively movable between a first position adjacent the plurality of cams to contact and apply a force to the plurality of cams to bias the plurality of cams into the bore of the body and a second position away from the plurality of cams so that the biasing element does not contact the plurality of cams and does not apply the force to the plurality of cams.

3. The connector of claim 1, wherein the biasing element is a ring which extends around an outside of the body and contacts the plurality of cams.

4. The connector of claim 1, wherein the biasing element is disposed on an exterior portion of the body which is tapered so as to slope towards a pivot of the plurality of cams.

5. The connector of claim 1, further comprising a tube formed of a plurality of inter-woven wires, the tube comprising: a first end attached to the body such that the wire may be passed through the body and into a lumen defined by the tube; and a second end attachable to a pulling line.

6. The connector of claim 1, wherein the body further comprises a plurality of slots formed therein, and wherein each of the plurality of cams is disposed in one of the plurality of slots, and wherein the plurality of cams are pivotable so as to pass through the plurality of slots.

7. The connector of claim 1, wherein the biasing element extends around an exterior of the body and contacts the plurality of cams.

8. The connector of claim 1, wherein the plurality of cams is disposed radially about a single point along the length of the body.

9. A connector comprising:
a generally tubular body having a bore therethrough;
a plurality of cams pivotably attached to the generally tubular body, the plurality of cams being pivotable relative to the generally tubular body between a first position where the plurality of cams extend into the bore of the generally tubular body so as to contact a wire when the wire is inserted in a first direction into the bore of the generally tubular body and a second position where the plurality of cams extend outwardly from the generally tubular body so as to release the wire to allow the wire to be withdrawn from the bore of the generally tubular body in a second direction opposite the first direction;
a biasing element for biasing the plurality of cams towards the center of the bore of the generally tubular body; and
a plurality of cables attached to an end of the generally tubular body, the plurality of cables being woven together so as to form a tube having a bore, and wherein the bore of the generally tubular body is in communication with the bore through the tube.

10. The connector of claim 9, wherein the biasing element is movable between a first position to contact and apply a biasing force to the plurality of cams and a second position where the biasing element does not contact the plurality of cams and does not apply the biasing force to the plurality of cams.

11. The connector of claim 9, wherein the biasing element is disposed around an exterior of the generally tubular body.

12. The connector of claim 9, wherein the biasing element is disposed around a portion of the generally tubular body which is tapered such that the biasing element reduces in size as the biasing element moves axially towards the plurality of cams.

13. The connector of claim 9, wherein each of the plurality of cams is disposed in a slot formed through the generally tubular body, and wherein the biasing element extends around the generally tubular body so as to contact the plurality of cams.

14. The connector of claim 9, wherein the plurality of cams are spaced out radially about a single point along the length of the generally tubular body.

15. The connector of claim 9, further comprising a loop for connecting the connector to a pulling line, the loop being disposed at an end of the tube opposite the generally tubular body.

16. The connector of claim 15, wherein the loop is formed from a proximal end of the plurality of cables.

17. A connector comprising:
a body having a bore therethrough;
a plurality of cams pivotably attached to the body, the plurality of cams being pivotable relative to the body between a first position where the plurality of cams extend into the bore of the body and a second position where the plurality of cams extend outwardly from the bore; and
a biasing element for biasing the plurality of cams towards the bore of the body, wherein the biasing element is selectively movable between a first position adjacent the plurality of cams to contact and apply a force to the plurality of cams to bias the plurality of cams into the bore of the body and a second position away from the plurality of cams so that the biasing element does not contact the plurality of cams and does not apply the force to the plurality of cams.

18. The connector of claim 17, further comprising a tube formed of woven wires attached to the body, the tube defining a lumen which is aligned with the bore of the body.

19. The connector of claim 17, wherein the biasing element is disposed around an exterior of the body.

20. The connector of claim 17, wherein the biasing element is disposed around a portion of the body which is tapered such that the biasing element reduces in size as the biasing element moves axially towards the plurality of cams.

* * * * *